United States Patent
Song et al.

(10) Patent No.: US 9,584,452 B2
(45) Date of Patent: Feb. 28, 2017

(54) METHOD, APPARATUS, AND SYSTEM FOR ADDING ELECTRONIC MAIL ATTACHMENT

(71) Applicant: Huawei Technologies Co., Ltd., Shenzhen (CN)

(72) Inventors: Liyan Song, Nanjing (CN); Yu Yin, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 360 days.

(21) Appl. No.: 14/318,949

(22) Filed: Jun. 30, 2014

(65) Prior Publication Data

US 2014/0317210 A1    Oct. 23, 2014

Related U.S. Application Data

(63) Continuation of application No. PCT/CN2012/084435, filed on Nov. 12, 2012.

(30) Foreign Application Priority Data

Mar. 22, 2012    (CN) .......................... 2012 1 0077457

(51) Int. Cl.
*G06F 15/16* (2006.01)
*H04L 12/58* (2006.01)
(Continued)

(52) U.S. Cl.
CPC ............. *H04L 51/08* (2013.01); *G06F 3/0481* (2013.01); *G06F 9/541* (2013.01); *G06Q 10/107* (2013.01); *H04L 12/584* (2013.01); *H04L 51/22* (2013.01)

(58) Field of Classification Search
CPC ........ H04L 12/584; H04L 51/00; H04L 51/08; H04L 51/18; H04L 51/22; G06Q 10/10–10/107
See application file for complete search history.

(56) References Cited

U.S. PATENT DOCUMENTS 6,651,087 B1 * 11/2003 Dennis ................. G06Q 10/107
709/205
6,687,741 B1 * 2/2004 Ramaley .............. G06Q 10/107
709/206

(Continued)

FOREIGN PATENT DOCUMENTS

CN    101079846 A    11/2007
CN    101123756 A    2/2008
(Continued)

OTHER PUBLICATIONS

Foreign Communication From a Counterpart Application, European Application No. 12871776.6, Extended European Search Report dated Feb. 25, 2015, 7 pages.

(Continued)

*Primary Examiner* — Brendan Higa
(74) *Attorney, Agent, or Firm* — Conley Rose, P.C.

(57) ABSTRACT

A method comprising: executing an operation on a file; obtaining a mail editing task list; determining at least one mail editing task; and sending an attachment adding instruction to a mail editing apparatus that generates the mail editing task to instruct the mail editing apparatus to add the file as an attachment of a mail corresponding to the mail editing task. Through the embodiments of the present invention, when a user executes an operation on a file, a current mail editing task list can be automatically obtained, and the file is used as an attachment of a mail corresponding to at least one determined mail editing task.

17 Claims, 8 Drawing Sheets

(51) Int. Cl.
*G06Q 10/10* (2012.01)
*G06F 3/0481* (2013.01)
*G06F 9/54* (2006.01)

(56) References Cited

U.S. PATENT DOCUMENTS

| | | | |
|---|---|---|---|
| 7,490,133 B1* | 2/2009 | Leban | G06F 9/542 |
| | | | 707/999.01 |
| 8,140,975 B2* | 3/2012 | Lemay | G06Q 10/107 |
| | | | 715/730 |
| 2001/0042093 A1 | 11/2001 | Shirai et al. | |
| 2002/0078466 A1* | 6/2002 | Beyda | H04N 7/17318 |
| | | | 725/109 |
| 2003/0009385 A1* | 1/2003 | Tucciarone | G06Q 10/107 |
| | | | 705/26.1 |
| 2004/0068545 A1 | 4/2004 | Daniell et al. | |
| 2004/0078752 A1* | 4/2004 | Johnson, Jr. | G06Q 10/107 |
| | | | 715/205 |
| 2005/0210111 A1 | 9/2005 | Fukudome | |
| 2007/0008574 A1* | 1/2007 | Henry | G06Q 10/107 |
| | | | 358/1.15 |
| 2007/0130369 A1 | 6/2007 | Nayak | |
| 2007/0136235 A1* | 6/2007 | Hess | G06F 17/30997 |
| 2012/0293844 A1* | 11/2012 | Liao | G06T 11/60 |
| | | | 358/474 |
| 2012/0320912 A1* | 12/2012 | Estrada | H04M 3/5116 |
| | | | 370/389 |

FOREIGN PATENT DOCUMENTS

| | | |
|---|---|---|
| CN | 102624649 A | 8/2012 |
| EP | 1339195 A2 | 8/2003 |
| EP | 2421210 A1 | 2/2012 |
| WO | 2010093288 A1 | 8/2010 |

OTHER PUBLICATIONS

Partial English Translation and Abstract of Chinese Patent Application No. CN101123756A, dated Apr. 29, 2014, Part 1, 8 pages.
Partial English Translation and Abstract of Chinese Patent Application No. CN101123756A, dated Apr. 29, 2014, Part 2, 5 pages.
Foreign Communication From a Counterpart Application, PCT Application No. PCT/CN2012/084435, English Translation of International Search Report dated Feb. 28, 2013, 2 pages.
Foreign Communication From a Counterpart Application, PCT Application No. PCT/CN2012/084435, Written Opinion dated Feb. 28, 2013, 6 pages.

* cited by examiner

METHOD, APPARATUS, AND SYSTEM FOR ADDING ELECTRONIC MAIL ATTACHMENT

CROSS-REFERENCE TO RELATED APPLICATIONS

This application is a continuation of International Application No. PCT/CN2012/084435, filed on Nov. 12, 2012, which claims priority to Chinese Patent Application No. 201210077457.3, filed on Mar. 22, 2012, both of which are hereby incorporated by reference in their entireties.

TECHNICAL FIELD

The present invention relates to a network communications technology, and in particular, to a method, an apparatus, and a system for adding an electronic mail attachment.

BACKGROUND

An electronic mail (E-mail) service provides a communications manner for exchanging information by electronic means, and is a basic Internet service.

An electronic mail can carry a file as an attachment. An operating manner for a user to add an electronic mail attachment is usually as follows: opening a mail editor (for example, outlook) or a mail editing web page, and editing a mail; clicking, on an interface of a mail editing window, a menu for adding an attachment, and then selecting a local file; and loading the selected local file to the mail as an attachment.

In the prior art, if a user intends to use a network file on a website as a mail attachment, the user needs to download the network file to a local file path, and then opens a mail editor or a mail editing web page to perform the foregoing operations; and if a user intends to use an edited file as a mail attachment, the user needs to save the edited file in a local file path, and then opens a mail editor or a mail editing web page to perform the foregoing operations.

A Windows-series operating system of MICROSOFT Company further provides an implementation method: right-clicking to select a local file; clicking a menu option "Send To" in a displayed context menu; and then clicking a sub-menu option "Mail Recipient". Then the operating system starts a default mail editor of the system, automatically creates a new mail, and loads the local file to the mail as an attachment.

In the prior art, a user needs to execute an operation of many steps to complete the adding of a mail attachment so that the operation is complex, efficiency is low, and user experience is poor.

SUMMARY

Embodiments of the present invention provide a method, an apparatus, and a system for adding an electronic mail attachment, which can solve a problem in the prior art that an operation for adding an electronic mail attachment is complex.

In one aspect, a method for adding an electronic mail attachment is provided. The method includes: executing an operation on a file; obtaining a mail editing task list, where the mail editing task list includes at least one mail editing task, and the mail editing task includes information used for locating a mail editing window corresponding to the mail editing task; determining at least one mail editing task; and sending an attachment adding instruction to a mail editing apparatus that generates the mail editing task, where the attachment adding instruction includes information used for locating a mail editing window corresponding to the mail editing task, and the file or an obtaining address of the file to instruct the mail editing apparatus to add the file to a mail that is edited in the mail editing window corresponding to the mail editing task, or add the obtaining address of the file to the mail so that a mail sending server for sending the mail or a mail receiving server for receiving the mail obtains the file according to the obtaining address and adds the file to the mail.

In another aspect, an apparatus for adding an electronic mail attachment is provided. The apparatus includes: a file operation unit configured to execute an operation on a file; a task obtaining unit configured to obtain a mail editing task list, where the mail editing task list includes at least one mail editing task, and the mail editing task includes information used for locating a mail editing window corresponding to the mail editing task; a task determining unit configured to determine at least one mail editing task; and an instruction sending unit configured to send an attachment adding instruction to a mail editing apparatus that generates the mail editing task, where the attachment adding instruction includes information used for locating a mail editing window corresponding to the mail editing task, and the file or an obtaining address of the file to instruct the mail editing apparatus to add the file to a mail that is edited in the mail editing window corresponding to the mail editing task, or add the obtaining address of the file to the mail so that a mail sending server for sending the mail or a mail receiving server for receiving the mail obtains the file according to the obtaining address and adds the file to the mail.

In another aspect, a system for adding an electronic mail attachment is provided. The system includes: a mail editing apparatus configured to start an editing operation for a mail; create a mail editing task corresponding to the mail; and add the mail editing task to a mail editing task list, where the mail editing task includes information used for locating a mail editing window for editing the mail; and a file operation apparatus configured to execute an operation on a file; obtain the mail editing task list, where the mail editing task list includes at least one mail editing task, and the mail editing task includes information used for locating a mail editing window corresponding to the mail editing task; determine at least one mail editing task; and send an attachment adding instruction to a mail editing apparatus that generates the mail editing task, where the attachment adding instruction includes information used for locating a mail editing window corresponding to the mail editing task, and the file or an obtaining address of the file.

The mail editing apparatus is further configured to receive the attachment adding instruction sent by the file operation apparatus; add the file to a mail that is edited in the mail editing window corresponding to the determined mail editing task, or add the obtaining address of the file to the mail so that a mail sending server for sending the mail or a mail receiving server for receiving the mail obtains the file according to the obtaining address and adds the file to the mail.

Through the embodiments of the present invention, when a user executes an operation on a file (for example, downloading a network file, editing a file, saving an edited file, or selecting a locally saved file), a current mail editing task list can be automatically obtained, and the file is used as an attachment of a mail corresponding to at least one determined mail editing task so that the user can add the currently operated file as the mail attachment by executing an operation of a few steps, thereby simplifying a user operation and improving user experience.

BRIEF DESCRIPTION OF DRAWINGS

To describe the technical solutions in the embodiments of the present invention more clearly, the accompanying drawings required for describing the embodiments or the prior art are introduced briefly in the following. The accompanying drawings in the following description show only some embodiments of the present invention, and a person of ordinary skill in the art may derive other drawings from these accompanying drawings without creative efforts.

DESCRIPTION OF EMBODIMENTS

The technical solutions in the embodiments of the present invention are clearly described in the following with reference to the accompanying drawings in the embodiments of the present invention. Apparently, the embodiments to be described are only a part rather than all of the embodiments of the present invention. All other embodiments obtained by a person of ordinary skill in the art based on the embodiments of the present invention without creative efforts shall fall within the protection scope of the present invention.

Figure 1:
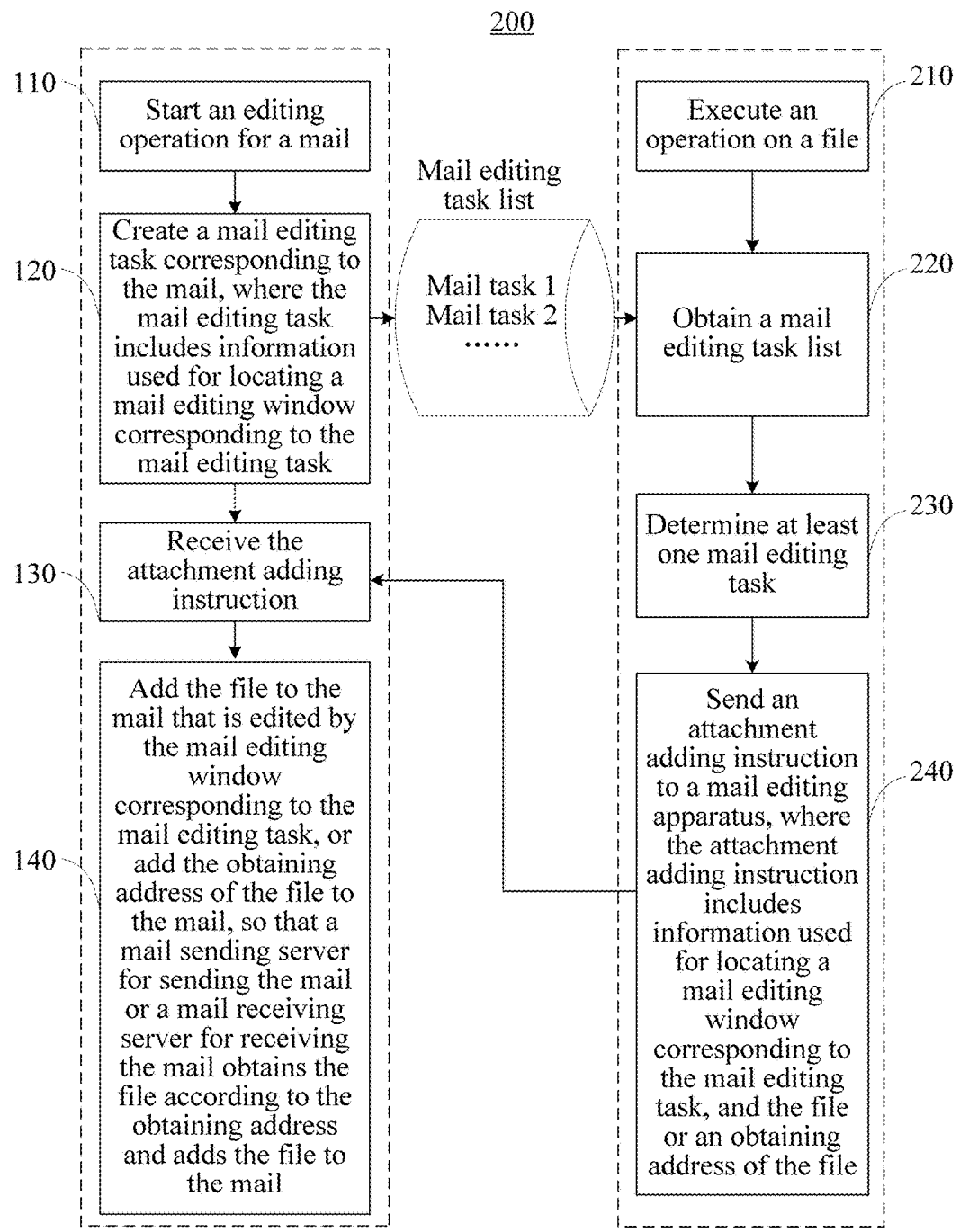
FIG. 1 is a schematic flowchart of a method according to a first embodiment of the present invention.

FIG. 1 is a schematic flowchart of a method for adding an electronic mail attachment according to a first embodiment of the present invention.

As shown in FIG. 1, the method 200 includes:

210: A file operation apparatus executes an operation on a file.

The file includes but is not limited to a network file, a file to be edited, and a locally saved file.

The operation on the file includes but is not limited to downloading a network file, editing a file, saving an edited file, and selecting a locally saved file.

The file operation apparatus may be a browser (for example, Windows Internet Explorer (IE) browser), a file editor (for example, MICROSOFT Office Word), or a file manager (for example, Windows Explorer).

Examples that the file operation apparatus executes an operation on a file are as follows: The Windows IE browser downloads a network file; the MICROSOFT Office Word saves an edited Word document; the MICROSOFT Office Word edits a Word document; and the Windows Explorer selects a locally saved file in response to a right-clicking operation.

220: The file operation apparatus obtains a mail editing task list, where the mail editing task list includes at least one mail editing task, and the mail editing task includes information used for locating a mail editing window corresponding to the mail editing task.

Preferably, the information used for locating the mail editing window corresponding to the mail editing task is a window identifier for identifying the mail editing window.

It should be noted that, the file operation apparatus may first determine whether the mail editing task list is null; and if the mail editing task list is null, subsequent steps are not performed.

Preferably, if the mail editing task list includes at least one mail editing task, the mail editing task list may be presented to a user for the user to perform selection. The presented information of the mail editing task may include a recipient, a mail title, and/or a content summary.

An exemplary implementation process of presenting the mail editing task list to the user for the user to perform selection is as follows: if the operation on the file is downloading a network file, a dialog box (for example, a file downloading dialog box and/or a Save As dialog box) may be displayed, and the mail editing task list is displayed on an interface of the dialog box for the user to perform selection.

Preferably, the obtaining of the mail editing task list, the displaying of the dialog box, an operation response to an option on the interface of the dialog box, and the like may be implemented in a manner that a browser executes a script of a file downloading web page of a web server.

The following provides three examples of a specific implementation manner.

Example 1: An interface example is shown in FIG. 2.

Figure 2:
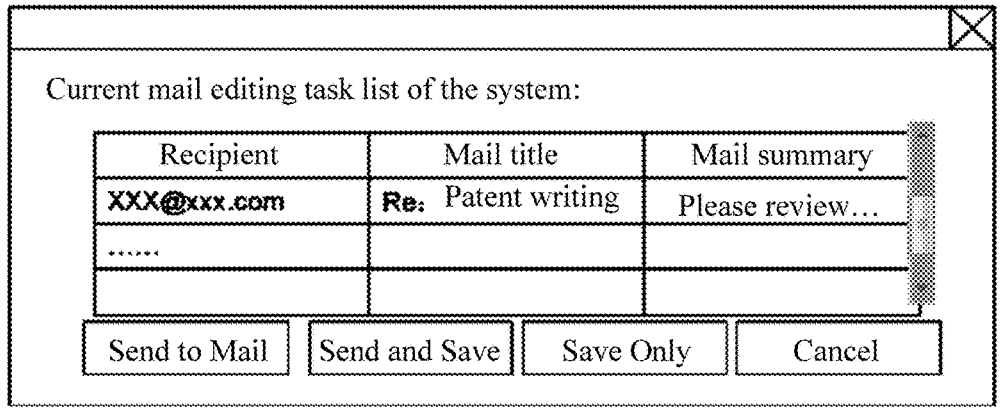
FIG. 2, FIG. 3A, FIG. 3B, FIG. 4A to FIG. 4C, FIG. 5A, and FIG. 5B are schematic diagrams showing an interface for displaying a mail editing task list according to the first embodiment of the present invention.

After a user clicks to download a file, a file downloading dialog box shown in FIG. 2 is displayed. The dialog box includes a mail editing task list, and a data item of the mail editing task may include a recipient, a mail title, and/or a mail summary. The dialog box includes options "Send to Mail" and "Cancel", and may further include options such as "Send and Save" and "Save Only".

After the user selects at least one mail editing task from the mail editing task list and clicks the option "Send to Mail" or the option "Send and Save", steps 230 to 240 are executed; and at the same time, a default file downloading dialog box of an operating system is displayed, and a normal file downloading operation is performed. If the user clicks the option "Save Only", a default file downloading dialog box of an operating system is displayed, and a normal file downloading operation is performed.

Example 2: Interface examples are shown in FIG. 3A and FIG. 3B.

Figure 3A:
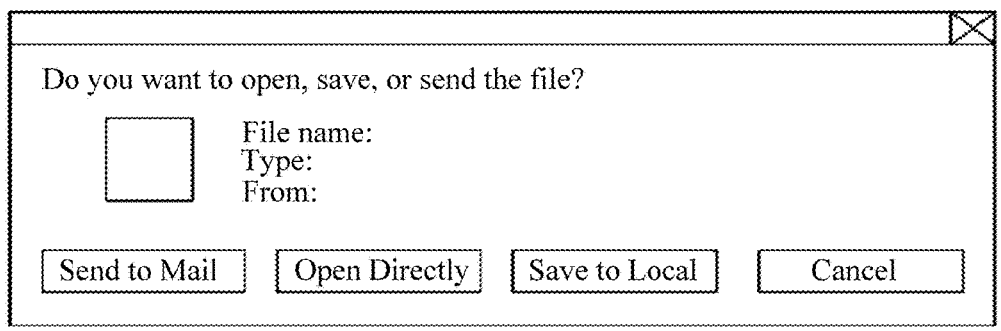

After a user clicks to download a file, a dialog box shown in FIG. 3A is first displayed, and the dialog box includes options "Send to Mail" and "Cancel", and may further include options such as "Open Directly" and "Save to Local".

Figure 3B:
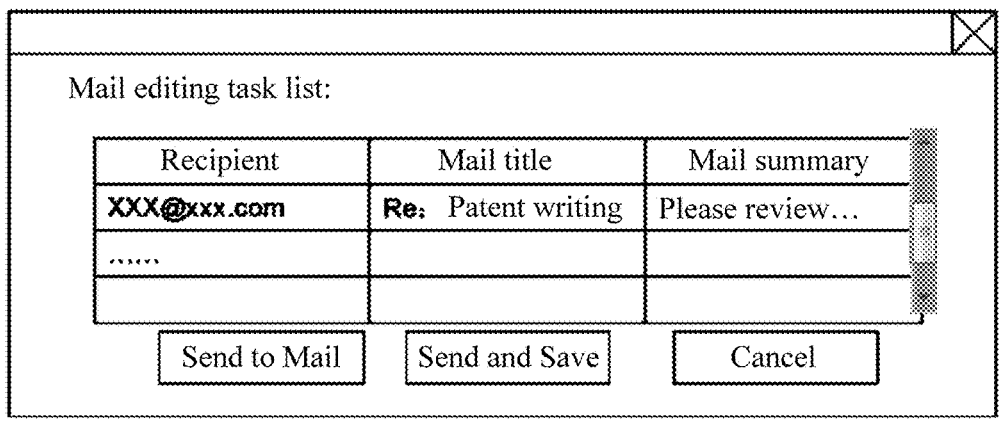

If the user selects the option "Send to Mail", a dialog box shown in FIG. 3B is displayed. The dialog box includes a mail editing task list for the user to perform selection, and a data item of the mail editing task may include a recipient, a mail title, and/or a mail summary. After the user selects at least one mail editing task from the mail editing task list and clicks the option "Send to Mail" or an option "Send and Save", steps 230 to 240 are executed; and at the same time, a default file downloading dialog box of an operating system is displayed, and a normal file downloading operation is performed. If the user clicks the option "Save to Local", a default file downloading dialog box of an operating system is displayed, and a normal file downloading operation is performed.

Example 3: Interface examples are shown in FIG. 4A, FIG. 4B, and FIG. 4C.

Figure 4A:
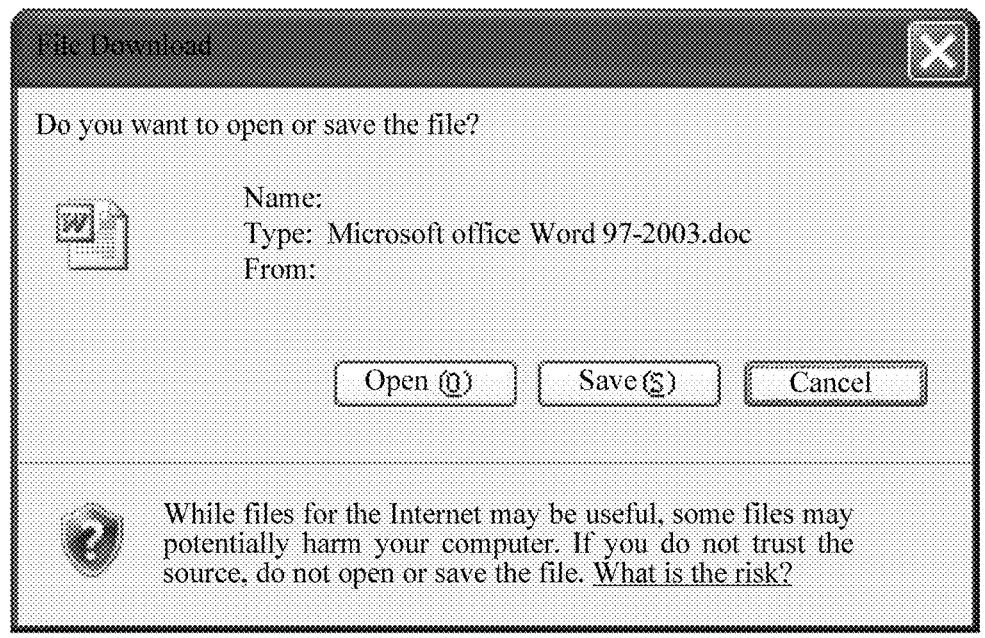

After a user clicks to download a file, a default file downloading dialog box of a Windows operating system shown in FIG. 4A is displayed.

Figure 4B:
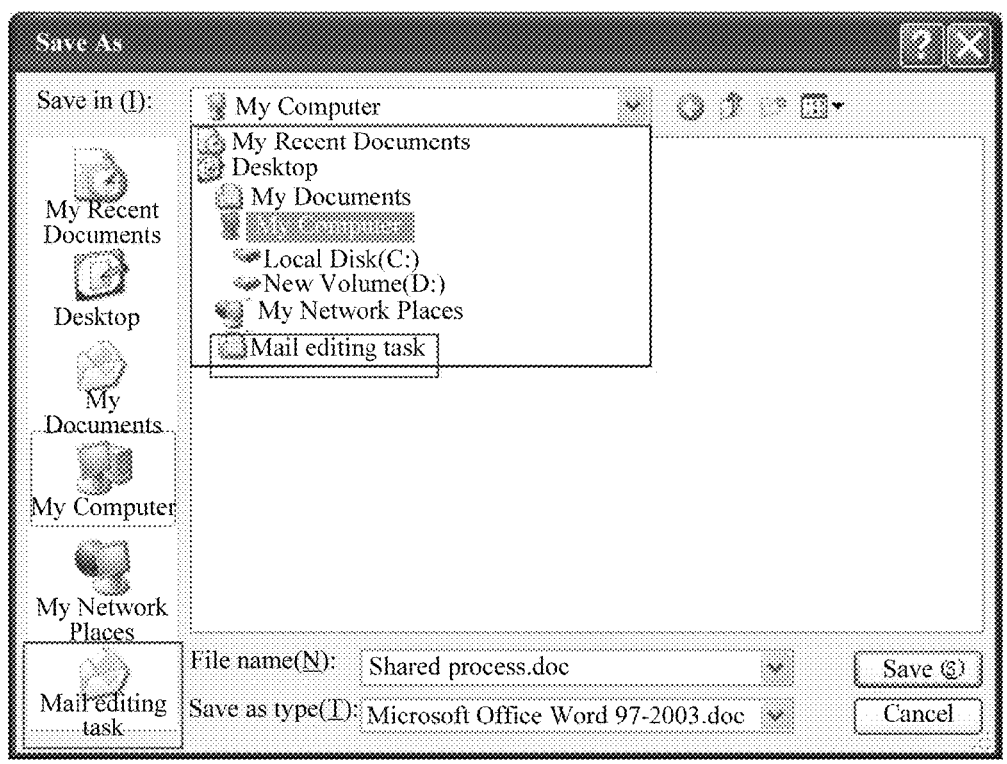

After the user selects an option "Save", a Save As dialog box shown in FIG. 4B is displayed, and a pull-down menu of an option "Save in" in the Save As dialog box includes an option "Mail Editing Task".

Figure 4C:
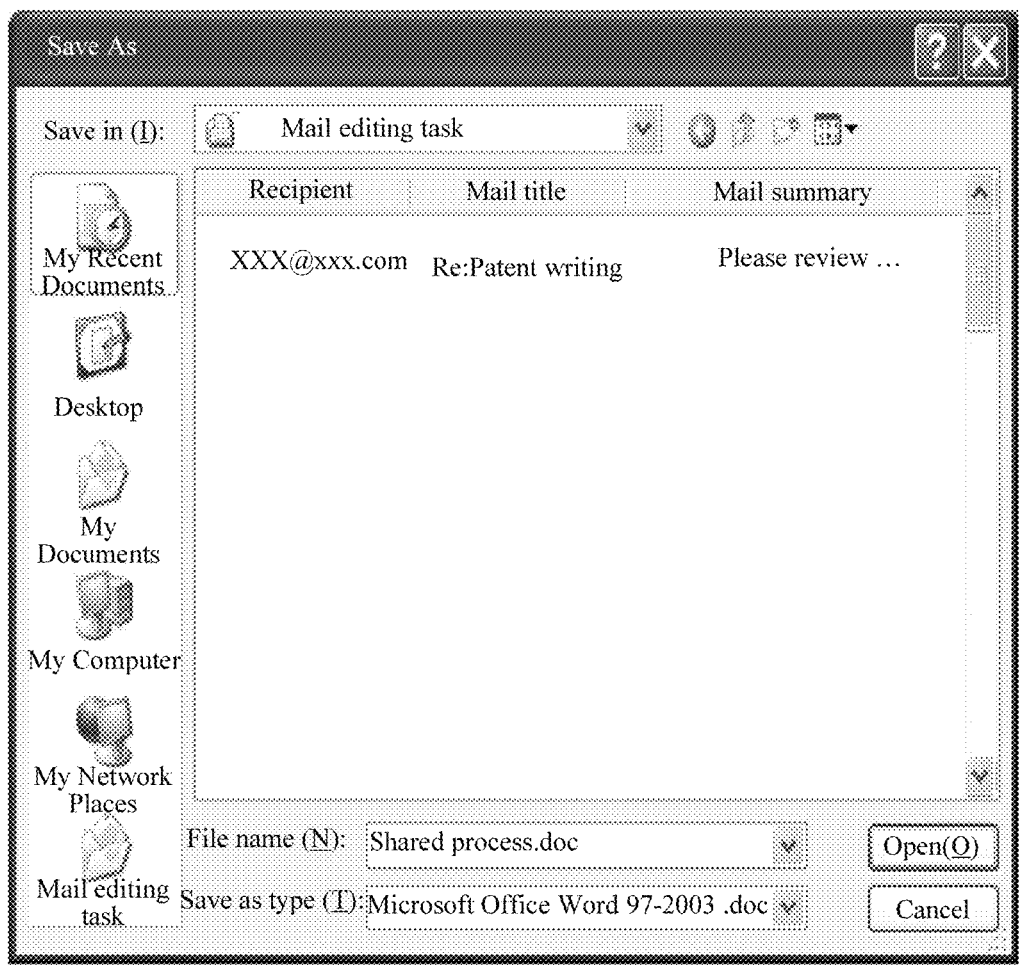

After the user selects the option "Mail Editing Task", as shown in FIG. 4C, a mail editing task list is listed in a main window for the user to perform selection. A data item of the mail editing task may include a recipient, a mail title, and/or a mail summary. After the user selects at least one mail editing task from the mail editing task list and clicks an option "Open", steps 230 to 240 are executed.

If the operation on the file is saving an edited file, a Save As dialog box shown in FIG. 4B may be displayed, and a pull-down menu of an option "Save in" in the Save As dialog box includes an option "Mail Editing Task".

After a user selects the option "Mail Editing Task", as shown in FIG. 4C, a mail editing task list is listed in a main window for the user to perform selection. A data item of the mail editing task may include a recipient, a mail title, and/or a mail summary. After the user selects at least one mail editing task from the mail editing task list and clicks an option "Open", steps 230 to 240 are executed.

Figure 5A:
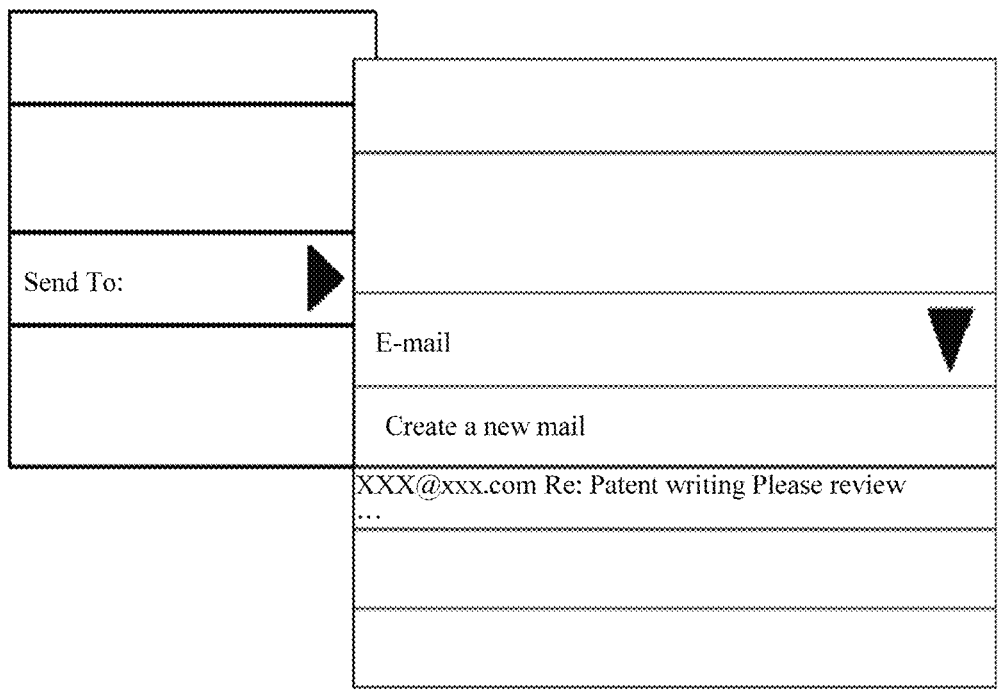
Figure 5B:
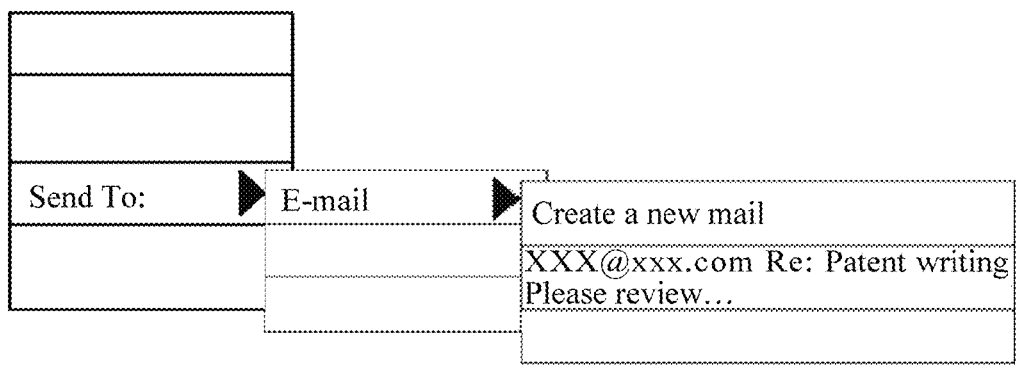

If the operation on the file is editing a file, the mail editing task list may be displayed in a menu of a file editor for a user to perform determining, and an example of a specific implementation manner is as follows:

After the user clicks a particular button (for example, an office button in windows word 2007) of the file editor, a menu shown in FIG. 5A or FIG. 5B is displayed. The menu includes the mail editing task list, and a data item of the mail editing task may include a recipient, a mail title, and/or a mail summary.

After the user selects at least one mail editing task from the mail editing task list in the menu, steps 230 to 240 are executed.

If the operation on the file is selecting a locally saved file, the mail editing task list may be displayed in a displayed menu for the user to perform selection, and an example of a specific implementation manner is as follows:

A locally saved file is select by right-clicking, and then a menu shown in FIG. 5A or FIG. 5B is displayed. The menu includes the mail editing task list, and a data item of the mail editing task may include a recipient, a mail title, and/or a mail summary.

After a user selects at least one mail editing task from the mail editing task list in the menu, steps 230 to 240 are executed.

It should be noted that, a mail editing task included in the mail editing task list is generated by a mail editing apparatus, and an exemplary implementation process of generating the mail editing task is shown in step 110 and step 120 in FIG. 1.

In step 110, the mail editing apparatus starts an editing operation on a mail, which may be as follows: when a user executes operations such as creating a new mail, clicking to forward a mail, clicking to reply a mail, and opening a saved mail draft, the mail editing apparatus starts the editing operation on the mail, including opening a mail editing window for editing the mail. The mail editing apparatus may be a mail editor (for example, Outlook), a browser (for example, a Windows IE browser), or the like, and the browser is a browser for opening the mail editing window.

An exemplary process is as follows: the user accesses an electronic mail box through the browser or the mail editor, and clicks a button or a menu used for creating a new mail to create a new mail; and the browser or the mail editor opens the mail editing window to edit the newly created mail.

In step 120, the mail editing apparatus creates a mail editing task corresponding to the mail, and adds the mail editing task to a mail editing task list, where the mail editing task includes information used for locating a mail editing window for editing the mail.

Preferably, the information used for locating the mail editing window corresponding to the mail editing task is a window identifier for identifying the mail editing window.

Preferably, the mail editing task may further include an identifier of the mail editing apparatus, such as an identifier of the mail editor that is used to open the mail editing window, or an identifier of the browser that is used to open the mail editing window. Specifically, the identifier of the mail editing apparatus may be a process identifier of the mail editing apparatus. The mail editing task may further include a task identifier, and the task identifier is an identifier for identifying the mail editing task.

If multiple mail editing windows are opened, multiple mail editing tasks are created.

Optionally, the mail editing task is stored in a magnetic disk.

Preferably, the mail editing task is stored in a data area of an operating system.

Preferably, the mail editing task is created in a register, where the register is stored in the data area of the operating system.

The operating system mentioned in the embodiment of the present invention includes but is not limited to a personal computer (PC) operating system (such as Windows, Linux, Mac OS), a server operating system (such as UNIX, Linux, Solaris, AIX), a tablet (e.g., a PAD) operating system or a smart phone operating system (such as iOS, Android, Windows-series). A following exemplary process is illustrated in detail by using a PC Windows-series operating system as an example.

A specific implementation manner for creating the mail editing task in the register is as follows: invoking an application programming interface (API, Application Programming Interface) provided by Windows to write a key of the mail editing task into the register; specifically, first invoking an apartment (APT) function provided by Windows to create an item "EDITMAILTASKLIST" (mail editing task list); and if the item "EDITMAILTASKLIST" exists, first opening the item "EDITMAILTASKLIST", and then invoking a RegSetValueEx function to generate a key of the editing mail task corresponding to the mail. A key name of the key may be the information used for locating the mail editing window for editing the mail, and may be the window identifier of the mail editing window, or the identifier of the mail editing apparatus and the window identifier. If the operation is creating a new mail, a key value of the key may be null; and if the operation is forwarding a mail, replying a mail, or editing a saved mail draft, the key value of the key may include at least one of a recipient, a mail title, and a mail content summary, where an exemplary format is as follows: receiver="jack", title="mail title", summary="good morning . . . ".

If the user further enters a recipient address, a mail title, and/or a mail content information summary in the mail editing window subsequently, the mail editing apparatus may record, in the mail editing task corresponding to the mail, the subsequently entered recipient address, mail title, and/or mail content information summary as a part of the key value of the key. Before the recording, the mail editing apparatus needs to obtain the mail editing task, which may be as follows: the mail editing apparatus obtains the mail editing task by using the task identifier of the mail editing task or the window identifier of the mail editing window.

If multiple mail editing windows are opened, multiple keys are added to an item "SYSTEM\EDITMAILTASKLIST\", that is, multiple mail editing tasks are created.

230: The file operation apparatus determines at least one mail editing task.

Specifically, at least one mail editing task may be determined according to selection of the user, for example, the at least one determined mail editing task is a mail editing task selected by the user in step 220.

Specifically, at least one mail editing task may also be determined according to a preset policy, for example, if the mail editing task list includes more than one mail editing tasks, the at least one determined mail editing task may be a latest created mail editing task, and may also be all mail editing tasks included in the mail editing task list; and if the mail editing task list includes only one mail editing task, the at least one determined mail editing task may be the only included mail editing task.

240: The file operation apparatus sends an attachment adding instruction to the mail editing apparatus that generates the mail editing task, where the attachment adding instruction includes information used for locating a mail editing window corresponding to the mail editing task, and the file or an obtaining address of the file.

After determining at least one mail editing task, the file operation apparatus sends the attachment adding instruction to the mail editing apparatus to instruct the mail editing apparatus to add the file or the obtaining address of the file to a mail that is edited in the mail editing window corresponding to the mail editing task.

The obtaining address of the file may be a network address for obtaining the file, and may be a local address for obtaining the file. Specifically, if the operation on the file is downloading a network file, the obtaining address of the file may be a network address for obtaining the file; if the operation on the file is downloading a network file or saving an edited file, and the file is locally saved before the attachment adding instruction is sent, the obtaining address of the file may be a local address for obtaining the file; and if the operation on the file is selecting a locally saved file, the obtaining address of the file may be a local address for obtaining the file.

Preferably, the mail editing task includes an identifier for identifying the mail editing apparatus, and before the sending an attachment adding instruction, the method further includes determining the mail editing apparatus according to the identifier of the mail editing apparatus.

If the mail editing apparatus is a mail editor, preferably, the sending an attachment adding instruction to the mail editing apparatus may be: sending the attachment adding instruction to the mail editor by invoking an API of the mail editor, which is: invoking, by the file operation apparatus, the API of the mail editor, where interface parameters of the API include the window identifier and the file to instruct the mail editor to add the file to a mail that is edited in the mail editing window corresponding to the window identifier. The sending an attachment adding instruction to the mail editing apparatus may also be: sending the attachment adding instruction to the mail editor through an operating system, which is: invoking an API of the operating system, where interface parameters of the API of the operating system include an identifier of the mail editor, the window identifier, and the file; determining, by the operating system, the mail editor according to the identifier of the mail editor; and sending the attachment adding instruction to the mail editor by invoking an API of the mail editor, where interface parameters of the API of the mail editor include the window identifier and the file to instruct the mail editor to add the file to a mail that is edited in the mail editing window identified by the window identifier. Optionally, the interface parameters of the invoked API of the operating system and the interface parameters of the invoked API of the mail editor may also include the obtaining address of the file instead of the file itself to instruct the mail editor to obtain the file according to the obtaining address of the file and add the file to the mail that is edited in the mail editing window identified by the window identifier, or instruct the mail editor to add the obtaining address of the file to the mail that is edited in the mail editing window identified by the window identifier.

The mail editing apparatus receives the attachment adding instruction, and adds the file or the obtaining address of the file to the mail that is edited in the mail editing window. A specific implementation process is shown in step 130 and step 140 in FIG. 1.

In step 130, the mail editing apparatus receives the attachment adding instruction.

In step 140, the mail editing apparatus adds the file or the obtaining address of the file to the mail that is edited in the mail editing window, specifically, which may be: adding the file included in the attachment adding instruction to the mail; may be: obtaining the file according to the obtaining address of the file, where the obtaining address of the file is included in the attachment adding instruction, and adding the file to the mail; or may be: adding the obtaining address of the file to the mail, where the obtaining address of the file is included in the attachment adding instruction so that a mail sending server for sending the mail or a mail receiving server for receiving the mail obtains the file according to the obtaining address of the file and adds the file to the mail as an attachment of the mail. Preferably, the obtaining address of the file is a network address for obtaining the file; and preferably, the mail editing apparatus adds, to the mail, an attachment indication corresponding to the obtaining address to instruct the mail sending server or the mail receiving server to obtain the file according to the obtaining address and add the file to the mail as the attachment of the mail.

If the mail editing apparatus is a browser, the window identifier may be a session identifier used for sending a session of the mail. Preferably, an exemplary implementation process of adding the file to the mail that is edited in the mail editing window is as follows: the browser for opening the mail editing window sends an attachment adding request to a mail web server, where the request includes the session identifier and the file so that the mail web server adds the file to a mail that is sent through a session identified by the session identifier, which is: the mail web server returns, to the browser, a script used for implementing the adding of the file to the mail; and the browser executes the script to add the file to the mail.

Optionally, the information used for locating the mail editing window corresponding to the mail editing task and included in the mail editing task may also be a task identifier. Correspondingly, the information used for locating the mail editing window corresponding to the mail editing task and included in the attachment adding instruction may also be a task identifier. After receiving the attachment adding instruction, the mail editing apparatus may obtain, according to the task identifier, a mail editing task identified by the task identifier, and obtain a window identifier in the mail editing task, and then add the file or the obtaining address of the file to the mail that is edited in the mail editing window.

According to the first embodiment of the present invention, a second embodiment of the present invention provides an apparatus for adding an electronic mail attachment to implement the foregoing method for adding an electronic mail attachment.

Figure 6:
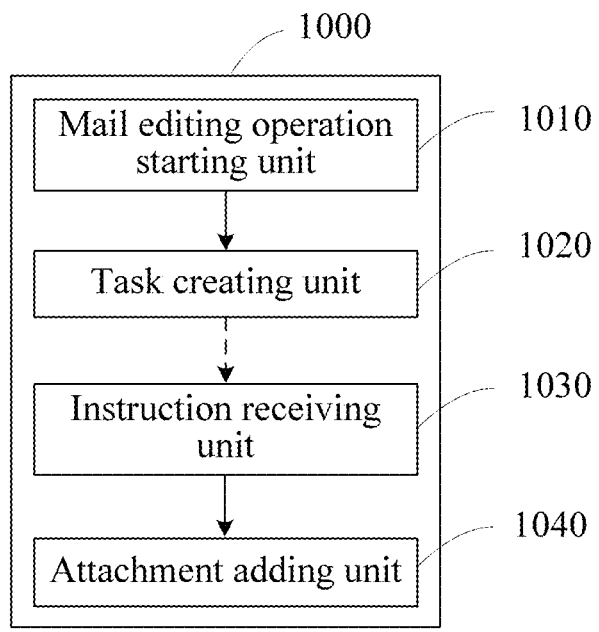
FIG. 6 is a schematic structural diagram of an apparatus according to a second embodiment of the present invention.

As shown in FIG. 6, the apparatus 1000 for adding an electronic mail attachment includes the following units: a mail editing operation starting unit 1010 configured to start an editing operation for a mail, where reference is made to step 110 in the first embodiment of the present invention for specific function implementation of the mail editing operation starting unit; a task creating unit 1020 configured to create a mail editing task corresponding to the mail and add the mail editing task to a mail editing task list, where the mail editing task includes information used for locating a mail editing window for editing the mail, and reference is made to step 120 in the first embodiment of the present invention for specific function implementation of the task creating unit; an instruction receiving unit 1030 configured to receive an attachment adding instruction sent by a file operation apparatus, where the attachment adding instruction includes information used for locating a mail editing window corresponding to a mail editing task that is determined from the mail editing task list, and a file or an obtaining address of the file, and reference is made to step 130 in the first embodiment of the present invention for specific function implementation of the instruction receiving unit; and an attachment adding unit 1040 configured to add the file or the obtaining address of the file to a mail that is edited in the mail editing window corresponding to the determined mail editing task, where reference is made to step 140 in the first embodiment of the present invention for specific function implementation of the attachment adding unit.

According to the first embodiment of the present invention, a third embodiment of the present invention provides an apparatus for adding an electronic mail attachment to implement the foregoing method for adding an electronic mail attachment.

Figure 7:
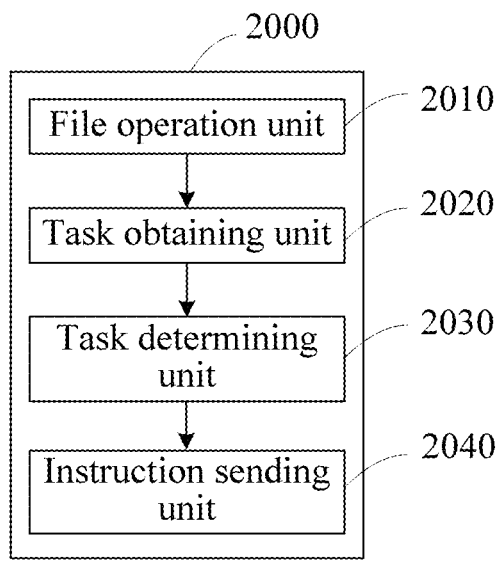
FIG. 7 is a schematic structural diagram of an apparatus according to a third embodiment of the present invention.

As shown in FIG. 7, the apparatus 2000 for adding an electronic mail attachment includes the following units: a file operation unit 2010 configured to execute an operation on a file, where reference is made to step 210 in the first embodiment of the present invention for specific function implementation of the file operation unit; a task obtaining unit 2020 configured to obtain a mail editing task list, where the mail editing task list includes at least one mail editing task, and the mail editing task includes information used for locating a mail editing window corresponding to the mail editing task, and reference is made to step 220 in the first embodiment of the present invention for specific function implementation of the task obtaining unit; a task determining unit 2030 configured to determine at least one mail editing task, where reference is made to step 230 in the first embodiment of the present invention for specific function implementation of the task determining unit; and an instruction sending unit 2040 configured to send an attachment adding instruction to a mail editing apparatus that generates the mail editing task, where the attachment adding instruction includes information used for locating a mail editing window corresponding to the mail editing task, and the file or an obtaining address of the file to instruct the mail editing apparatus to add the file or the obtaining address of the file to a mail that is edited in the mail editing window corresponding to the mail editing task, and reference is made to step 240 in the first embodiment of the present invention for specific function implementation of the instruction sending unit.

It should be noted that the third embodiment of the present invention may be combined with the second embodiment of the present invention.

According to the first embodiment to the third embodiment of the present invention, a fourth embodiment of the present invention provides a system for adding an electronic mail attachment to implement the foregoing method for adding an electronic mail attachment.

Figure 8:
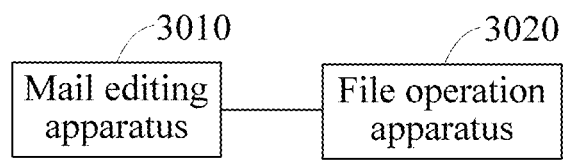
FIG. 8 is a schematic structural diagram of a system according to a fourth embodiment of the present invention.

As shown in FIG. 8, the system for adding an electronic mail attachment includes: a mail editing apparatus 3010, which is the apparatus described in the second embodiment; and a file operation apparatus 3020, which is the apparatus described in the third embodiment.

The mail editing apparatus and the file operation apparatus described in the first embodiment to the fourth embodiment of the present invention can be implemented through electronic hardware or a combination of computer software and electronic hardware. If the mail editing apparatus and the file operation apparatus are implemented through the combination of computer software and electronic hardware, specifically, they may be implemented by running a program on a computer system, where the computer system includes but is not limited to a computer system of a personal computer (PC), a server, a PAD, a smart phone, or the like.

Figure 9A:
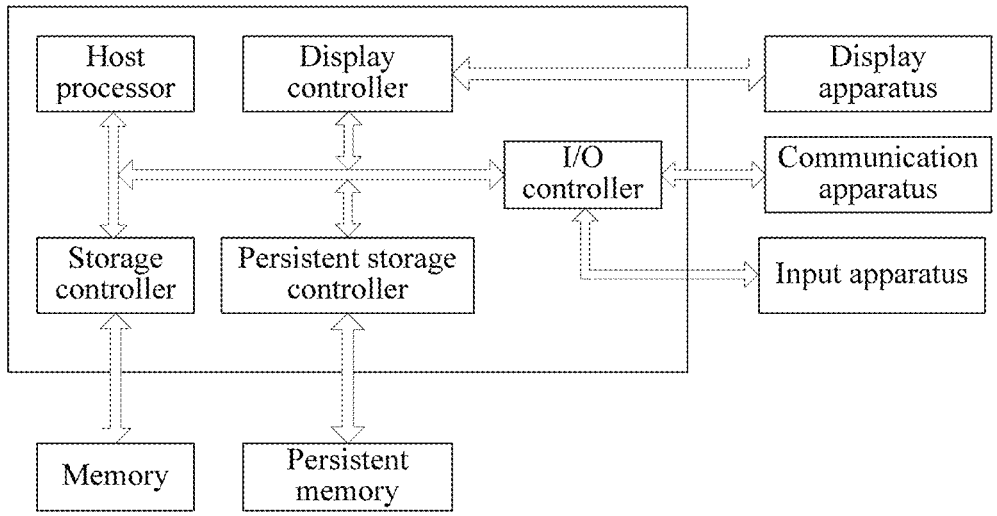
FIG. 9A is a schematic structural diagram of a computer system according to an embodiment of the present invention.

A schematic structural diagram of the computer system is shown in FIG. 9A, which includes a host processor, a memory, a storage controller, a persistent memory, a persistent storage controller, a display apparatus, a display controller, an input apparatus, an input/output (I/O) controller, and a communication apparatus.

The host processor is configured to process a computer operating instruction and data. The computer operating instruction may include an instruction used for mail editing and an instruction used for executing a file operation; and the data may be the mail editing task described in the first embodiment to the fourth embodiment. The host processor is a computer core unit, that is, a central processing unit (CPU).

The memory is configured to store the computer operating instruction and the data. The computer operating instruction may include the instruction used for mail editing and the instruction used for executing a file operation; and the data includes data required for processing the operating instruction and data generated during executing of the operating instruction, where the data generated during the executing of the operating instruction may be the mail editing task described in the first embodiment to the fourth embodiment.

The storage controller is configured to perform addressing and access the operating instruction and data that are stored in the memory. The storage controller is controlled by the host processor.

The persistent memory is configured to persistently store an application, an operating system, and file data. The application may be an application such as the mail editor or the browser described in the first embodiment to the fourth embodiment, and the file data may be file data, such as a downloaded network file or a locally saved file, which is to be added to the mail in the first embodiment to the fourth embodiment. The persistent storage apparatus includes but is not limited to a magnetic disk, a magnetic tape, a memory card, and the like.

The persistent storage controller is configured to perform addressing and access the application, operating system, and file data that are stored in the persistent memory. The persistent memory is controlled by the host processor.

The display apparatus is configured to display a computer processing result. The computer processing result may be an operation process and an operation result (including the mail editing window, a file operation interface, the mail editing task list, and the like) for applications such as the mail editor and the browser in the first embodiment to the fourth embodiment. The display apparatus includes but is not limited to a display, a display screen, a touchscreen, and the like.

The display controller is configured to control the display apparatus to display the computer processing result.

The input apparatus is configured to input an operating instruction. The operating instruction may be an operating instruction for the mail editor and the browser in the first embodiment to the fourth embodiment. The input apparatus includes but is not limited to a keyboard, a mouse, a touchscreen, and the like.

The I/O controller is configured to control input and output of the computer system. The I/O controller is configured to control input of the input apparatus.

The communication apparatus is configured to enable the apparatus to access an Internet/Intranet network. Specifically, a mail editing application such as the mail editor in the first embodiment to the fourth embodiment may send a mail to the mail sending server through the communication apparatus, and a file operation application such as the browser may access, through the communication apparatus, a website in the network to download a network file. The communication apparatus includes but is not limited to an Ethernet card, a General Packet Radio Service (GPRS) module, a Wireless Fidelity (WIFI) module, a Third Generation Telecommunications (3G) module, and the like.

Because an access speed of the memory is faster than that of the persistent memory, preferably, the computer instruction and data are loaded to the memory and the host processor processes the computer instruction and data.

Figure 9B:
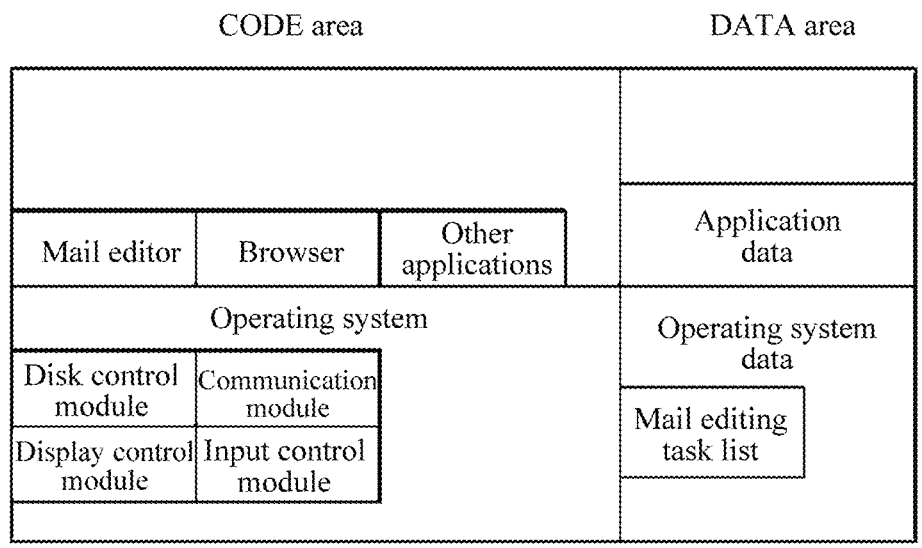
FIG. 9B is a schematic structural diagram of a memory according to an embodiment of the present invention.

As shown in FIG. 9B, the memory includes a CODE area and a DATA area. The CODE area is used to store a computer operating instruction, and the DATA area is used to store data, where the data may include data required for processing the operating instruction and data generated during executing of the operating instruction. Specifically, after the computer system starts up, the operating system is loaded to the CODE area, and at the same time, a data area of the operating system is applied for in the DATA area for the operating system to store data required for running. After applications run on the operating system, the applications (such as a mail editing application such as the mail editor and the browser, and a file operation application such as the file editor, the file manager, and the browser) are loaded to the CODE area, and at the same time, data areas of the applications are applied for in the DATA area for the running of the applications. Preferably, the operating system accesses the data area of the operating system, and the applications can access only the data areas of the applications. Because the mail editing task list in the present invention needs to be accessed and used by multiple applications, preferably, the mail editing task list is placed in the data area of the operating system, and the register described in the first embodiment to the fourth embodiment is stored in the data area of the operating system.

A person of ordinary skill in the art may be aware that, with reference to the examples described in the embodiments disclosed in this specification, units and algorithm steps may be implemented by electronic hardware or a combination of computer software and electronic hardware. Whether these functions are executed in a hardware manner or a software manner depends upon particular applications and design constraint conditions of the technical solutions. A person skilled in the art may use a different method to implement the described functions for each particular application, but it should not be considered that such implementation goes beyond the scope of the present invention.

It may be clearly understood by a person skilled in the art that, for the purpose of convenient and brief description, for a detailed working process of the foregoing apparatus and unit, reference may be made to a corresponding process in the foregoing method embodiment, and details are not described herein again.

In several embodiments provided in the present application, it should be understood that the disclosed apparatus and method may be implemented in other ways. For example, the described apparatus embodiments are merely exemplary. For example, the unit division is merely logical function division and may be other division in actual implementation. For example, multiple units or components may be combined or integrated into another system, or some features may be ignored or not performed. In addition, the shown or discussed couplings or direct couplings or communications connections may be implemented through some interfaces. The indirect couplings or communications connections between apparatuses or units may be implemented in electrical or other forms.

The units described as separate components may be or may not be physically separate, and the parts shown as units may be or may not be physical units, may be located in one position, or may be distributed on multiple network units. Some or all of the units may be selected to achieve the objectives of the solutions in the embodiments according to an actual need.

In addition, functional units in the embodiments of the present invention may be integrated in one processing unit, each of the units may exist alone physically, or two or more than two units may be integrated in one unit.

When the functions are implemented in the form of a software functional module and sold or used as an independent product, the functions may be stored in a computer-readable storage medium. Based on such an understanding, the technical solutions of the present invention essentially, or a part contributing to the prior art, or a part of the technical solutions may be implemented in the form of a software product. The computer software product is stored in a storage medium and includes several instructions for instructing a computer apparatus (which may be a personal computer, a server, or a network apparatus) to perform all or a part of the steps of the methods described in the embodiments of the present invention. The foregoing storage medium includes any mediums capable of storing program code, such as a universal serial bus (USB) flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the claims.

What is claimed is:

1. A method for adding an electronic mail attachment, comprising:
   executing an operation on a file;
   obtaining a mail editing task list, wherein the mail editing task list comprises one or more mail editing tasks, and wherein the one or more mail editing tasks comprises information used for locating a mail editing window corresponding to the one or more mail editing tasks;
   determining an editing task from the one or more mail editing tasks; and
   sending an attachment adding instruction to a mail editing apparatus corresponding to the mail editing task, wherein the attachment adding instruction comprises information used for locating a mail editing window corresponding to the mail editing task and either the file or an obtaining address of the file, and wherein the attachment adding instruction instructs the mail editing apparatus to either add the file to a mail that is edited in the mail editing window corresponding to the mail editing task or add the obtaining address of the file to the mail.

2. The method according to claim 1, wherein the information used for locating the mail editing window corresponding to the mail editing task comprises a window identifier for identifying the mail editing window.

3. The method according to claim 1, wherein the mail editing task further comprises an identifier for identifying the mail editing apparatus, and wherein before sending the attachment adding instruction to the mail editing apparatus corresponding to the mail editing task, the method further comprises determining the mail editing apparatus according to the identifier of the mail editing apparatus.

4. The method according to claim 2, wherein the mail editing apparatus comprises a mail editor, wherein sending the attachment adding instruction to the mail editing apparatus corresponding to the mail editing task comprises sending the attachment adding instruction to the mail editor by invoking an application programming interface (API) of the mail editor, wherein interface parameters of the API comprise the window identifier and the file, and wherein the mail editor is configured to add the file to the mail that is edited in the mail editing window identified by the window identifier.

5. The method according to claim 2, wherein the mail editing apparatus comprises a mail editor, wherein the mail editing task further comprises an identifier for identifying the mail editor, wherein sending the attachment adding instruction to the mail editing apparatus corresponding to the mail editing task comprises:
   sending the attachment adding instruction to the mail editor by invoking an application programming interface (API) of an operating system, wherein interface parameters of the API of the operating system comprise the identifier of the mail editor and the window identifier;
   determining, by the operating system, the mail editor according to the identifier of the mail editor; and
   sending the attachment adding instruction to the mail editor by invoking an API of the mail editor, wherein interface parameters of the API of the mail editor comprise the window identifier and the file, and wherein the mail editor to add the file to a mail that is edited in the mail editing window identified by the window identifier.

6. The method according to claim 1, wherein before determining the mail editing task from the one or more mail editing tasks, the method further comprises displaying the mail editing task list for a user to perform selection, and wherein a data item of the displayed mail editing task list comprises at least one of a recipient, a mail title, and a mail content summary.

7. The method according to claim 6, wherein displaying the mail editing task list comprises:
   displaying a dialog box or a menu; and
   displaying the mail editing task list on an interface of the dialog box, in a main window of the dialog box, or in the menu.

8. The method according to claim 1, wherein the operation on the file comprises one of the following operations: downloading a network file, editing a file, saving an edited file, and selecting a locally saved file.

9. A method for adding an electronic mail attachment, comprising:
   starting an editing operation for a mail;
   creating a mail editing task corresponding to the mail, wherein the mail editing task is one item in a mail editing task list, and wherein the mail editing task comprises information used for locating a mail editing window for editing the mail;
   receiving an attachment adding instruction, wherein the attachment adding instruction comprises the information used for locating the mail editing window corresponding to the mail editing task that is determined from the mail editing task list, and either a file or an obtaining address of the file; and
   either adding the file to a mail that is edited in the mail editing window corresponding to the determined mail editing task or adding the obtaining address of the file to the mail.

10. The method according to claim 9, wherein the information used for locating the mail editing window corresponding to the mail editing task comprises a window identifier for identifying the mail editing window.

11. The method according to claim 10, wherein creating the mail editing task comprises:
    invoking, by a mail editing apparatus, an application programming interface (API) provided by an operating system; and
    creating, in a register, a key of the mail editing task corresponding to the mail, wherein a key name of the key comprises an identifier for identifying the mail editing apparatus and the window identifier, and a key value of the key is null, or a key value of the key comprises at least one of a recipient, a mail title, and a mail content summary.

12. An apparatus for adding an electronic mail attachment, comprising:
    a processor; and
    a non-transitory computer readable medium which contains computer-executable instructions,
    wherein the processor is configured to execute the computer-executable instructions to perform operations comprising:
        executing an operation on a file;
        obtaining a mail editing task list, wherein the mail editing task list comprises one or more mail editing tasks, and wherein the one or more mail editing tasks comprises information used for locating a mail editing window corresponding to the one or more mail editing tasks;

determining a mail editing task from the one or more mail editing tasks; and sending an attachment adding instruction to a mail editing apparatus corresponding to the mail editing task, wherein the attachment adding instruction comprises information used for locating a entail editing window corresponding to the mail editing task and either the file or an obtaining address of the file, wherein the attachment adding instruction instructs the mail editing apparatus to add either the file or the obtaining address of the file to a mail that is edited in the mail editing window corresponding to the mail editing task.

13. The apparatus according to claim 12, wherein the mail editing task further comprises an identifier for identifying the mail editing apparatus, and wherein the processor is further configured to execute the computer-executable instructions to determine the mail editing apparatus according to the identifier of the mail editing apparatus.

14. An apparatus for adding an electronic mail attachment, comprising:

a processor; and a non-transitory computer readable medium which contains computer-executable instructions, wherein the processor is configured to execute the computer-executable instructions to perform operations comprising:

starting an editing operation for a mail;

creating a mail editing task corresponding to the mail and add the mail editing task to a mail editing task list, wherein the mail editing task comprises information used for locating a mail editing window for editing the mail;

receiving an attachment adding instruction, wherein the attachment adding instruction comprises the information used for locating the mail editing window corresponding to the mail editing task that is determined from the mail editing task list, and either a file or an obtaining address of the file; and either adding the file or the obtaining address of the file to a mail that is edited in the mail editing window corresponding to the determined mail editing task.

15. A system for adding an electronic mail attachment, comprising:

a processor; and a non-transitory computer readable medium which contains computer-executable instructions, wherein the processor is configured to execute the computer-executable instructions to:

execute an operation on a file;

obtain a mail editing task list, wherein the mail editing task list comprises one or more mail editing tasks, and wherein the one or more mail editing tasks comprises information used for locating a mail editing window corresponding to the one or more mail editing tasks;

determine a mail editing task from the one or more mail editing tasks;

create an attachment adding instruction corresponding to the mail editing task, wherein the attachment adding instruction comprises information used for locating a mail editing window corresponding to the mail editing task and either the file or an obtaining address of the file, thereby adding either the file or the obtaining address of the file to a mail that is edited in the mail editing window corresponding to the mail editing task;

start an editing operation for the mail;

create the mail editing task corresponding to the mail and add the mail editing task to the mail editing task list, wherein the mail editing task comprises the information used for locating the mail editing window for editing the mail;

receive the attachment adding instruction, wherein the attachment adding instruction comprises the information used for locating the mail editing window corresponding to the mail editing task that is determined from the mail editing task list and either the file or the obtaining address of the file; and add either the file or the obtaining address of the file to the mail that is edited in the mail editing window corresponding to the determined mail editing task.

16. A non-transitory computer readable medium containing computer-executable instructions, wherein the computer-executable instructions, when executed by a processor of an apparatus, cause the apparatus to perform operations comprising:

executing an operation on a file;

obtaining a mail editing task list, wherein the mail editing task list comprises one or more mail editing tasks, and wherein the one or more mail editing tasks comprises information used for locating a mail editing window corresponding to the one or more mail editing tasks;

determining an editing task from the one or more mail editing tasks; and sending an attachment adding instruction to a mail editing apparatus corresponding to the mail editing task, wherein the attachment adding instruction comprises information used for locating a mail editing window corresponding to the mail editing task and either the file or an obtaining address of the file, and wherein the attachment adding instruction instructs the mail editing apparatus to either add the file to a mail that is edited in the mail editing window corresponding to the mail editing task or add the obtaining address of the file to the mail.

17. A non-transitory computer readable medium containing computer-executable instructions, wherein the computer-executable instructions, when executed by a processor of an apparatus, cause the apparatus to perform operations comprising:

starting an editing operation for a mail;

creating a mail editing task corresponding to the mail, wherein the mail editing task is one item in a mail editing task list, and wherein the mail editing task comprises information used for locating a mail editing window for editing the mail;

receiving an attachment adding instruction, wherein the attachment adding instruction comprises the information used for locating the mail editing window corresponding to the mail editing task that is determined from the mail editing task list, and either a file or an obtaining address of the file; and either adding the file to a mail that is edited in the mail editing window corresponding to the determined mail editing task or adding the obtaining address of the file to the mail.

\* \* \* \* \*